US011006160B2

(12) United States Patent
Schnurr et al.

(10) Patent No.: US 11,006,160 B2
(45) Date of Patent: May 11, 2021

(54) EVENT PREDICTION ENHANCEMENTS

(71) Applicant: Microsoft Technology Licensing, LLC, Redmond, WA (US)

(72) Inventors: William Robert Schnurr, Vancouver (CA); Cameron McRae, Port Coquitlam (CA); Myvictor Tran, Surrey (CA); Michael Mahar, Vancouver (CA); Preetinderpal Singh Mangat, Surrey (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 1301 days.

(21) Appl. No.: 14/992,752

(22) Filed: Jan. 11, 2016

(65) Prior Publication Data

US 2017/0061314 A1    Mar. 2, 2017

Related U.S. Application Data

(60) Provisional application No. 62/209,301, filed on Aug. 24, 2015.

(51) Int. Cl.
*G06N 5/04* (2006.01)
*H04N 21/258* (2011.01)
*H04N 21/431* (2011.01)
*H04N 21/81* (2011.01)
(Continued)

(52) U.S. Cl.
CPC .  *H04N 21/25891* (2013.01); *H04N 21/23418* (2013.01); *H04N 21/4316* (2013.01); *H04N 21/8126* (2013.01); *G06N 5/04* (2013.01); *G06N 20/00* (2019.01)

(58) Field of Classification Search
None
See application file for complete search history.

(56) References Cited

U.S. PATENT DOCUMENTS 6,840,861 B2    1/2005 Jordan et al.
7,519,564 B2    4/2009 Horvitz
(Continued)

FOREIGN PATENT DOCUMENTS

CN        101422036 A  *  4/2009  ....... H04N 21/41407
WO    WO-2006125303 A1 *  11/2006  ............. G06Q 10/00

OTHER PUBLICATIONS

Myers, Statistical Model Predicts with High Accuracy Play-Calling Tendency of NFL Teams, American Statistical Association, Aug. 12, 2015, pp. 1-3 (Year: 2016).*

(Continued)

*Primary Examiner* — Wilbert L Starks
(74) *Attorney, Agent, or Firm* — Alleman Hall Creasman & Tuttle LLP

(57) ABSTRACT

Live-action event data is received during a live-action event from an event reporting computing system via a computer network interface. The live-action event data is provided to a machine-learning prediction machine previously trained with previously-completed event data to output a prediction for an upcoming aspect of the live-action event. The prediction is sent to a client computing system via the computer network interface prior to commencement of the upcoming aspect to enhance a live-action event experience provided by the client computing system.

20 Claims, 6 Drawing Sheets

(51) Int. Cl.
*H04N 21/234* (2011.01)
*G06N 20/00* (2019.01)

(56) References Cited

U.S. PATENT DOCUMENTS

| | | | |
|---|---|---|---|
| 7,840,682 B2 * | 11/2010 | Boyd | H04L 67/14 |
| | | | 709/227 |
| 8,388,445 B2 | 3/2013 | Pavlich et al. | |
| 9,033,781 B2 | 5/2015 | Steir et al. | |
| 2009/0054127 A1 | 2/2009 | Sweary et al. | |
| 2014/0302918 A1 | 10/2014 | Minitzer | |

OTHER PUBLICATIONS

Heskin, et al. (Pub. No. WO/2006/125303; International Application No. PCT/CA2006/000816; Dated: Nov. 30, 2006) Determining Odds of a Possible Outcome of an Event Which Occurs During a Contest (Year: 2006).*

Myers, Statistical Model Predicts with High Accuracy Play-Calling Tendency of NFL Teams, American Statistical Association, Aug. 12, 2015, pp. 1-3 (Year: 2015).*

Lu, Learning to Track and Identify Players from Broadcast Sports Videos, Doctoral Thesis, The University Of British Columbia, 2011, pp. 1-113 (Year: 2011).*

Li, Description, Analysis and Prediction of Player Actions in Selected Hockey Game Situations, Masters Thesis, The University of British Columbia, 2004, pp. 1-103 (Year: 2004).*

Warner, Jim, "Predicting Margin of Victory in NFL Games: Machine Learning vs. the Las Vegas Line", Published on: Dec. 17, 2010 Available at: http://www.cs.cornell.edu/courses/cs6780/2010fa/projects/warner_cs6780.pdf.

Blundell, Jack David, "Numerical Algorithms for Predicting Sports Results", In Doctoral Dissertation, University of Leeds, Dec. 15, 2011, 7 pages.

Boulier, et al., "Predicting the outcomes of National Football League games", In International Journal of Forecasting, vol. 19, Issue 2, Apr. 2003, pp. 257-270.

Joseph, et al., "Predicting Football Results using Bayesian Nets and other Machine Learning Techniques", In Journal of Knowledge-Based Systems, vol. 19, Issue 7, Nov. 2006, pp. 1-10.

Timmaraju, et al., "Game On! Predicting English Premier League Match Outcomes", Published on: Jan. 23, 2014 Available at: http://cs229.stanford.edu/proj2013/TimmarajuPalnitkarKhanna-GameON!PredictionOfEPLMatchOutcomes.pdf.

Harris, Derrick, "Can Machine Learning make Sense of the NFL's Big Data?", Published on: Nov. 25, 2012 Available at: https://gigaom.com/2012/11/25/can-machine-learning-make-sense-of-the-nfls-big-data/.

"Scores & Video—Football Live Scores, Stats and Chats", Retrieved on: Aug. 18, 2015 Available at: https://itunes.apple.com/us/app/scores-video-football-live/id888056240?mt=8.

Dejong, David N., "Using Past Performance to Predict NFL Outcomes: A Chartist Approach", Published on: Mar. 1997 Available at: www.pitt.edu/~dejong/Chartist.pdf.

* cited by examiner

EVENT PREDICTION ENHANCEMENTS

CROSS REFERENCE TO RELATED APPLICATION

This application claims priority to U.S. Patent Application No. 62/209,301, filed Aug. 24, 2015, the entirety of which is hereby incorporated herein by reference.

BACKGROUND

Visual presentation of a live-action sporting event may be enhanced with corresponding visual presentation of auxiliary information associated with the live-action sporting event.

DETAILED DESCRIPTION

Sporting events are available via a variety of different broadcasting modalities, including over-the-air television, cable television, Internet television, and on-demand video. Regardless of the broadcasting modality, live or time-shifted sporting event broadcasts may be supplemented with information that is not included as part of the original broadcast. Furthermore, the enhancements to the original broadcast may be automatically tailored to a particular viewer based on various viewer-specific criteria. In this way, different viewers watching the same sporting event may experience different viewer-specific auxiliary information. As described in more detail below, such auxiliary information may include various updates and notifications, statistical data and/or predictions, and/or complete user interfaces for simulating different sporting event scenarios. Such auxiliary information may be used to help a viewer navigate between different sporting events, keep a viewer appraised of various fantasy sport athletes, and/or provide other information interesting to the viewer. When used in this manner, sporting events are enhanced in a personalized manner. Additionally or alternatively, enhancements may be provided in a non-personalized manner.

Figure 1:
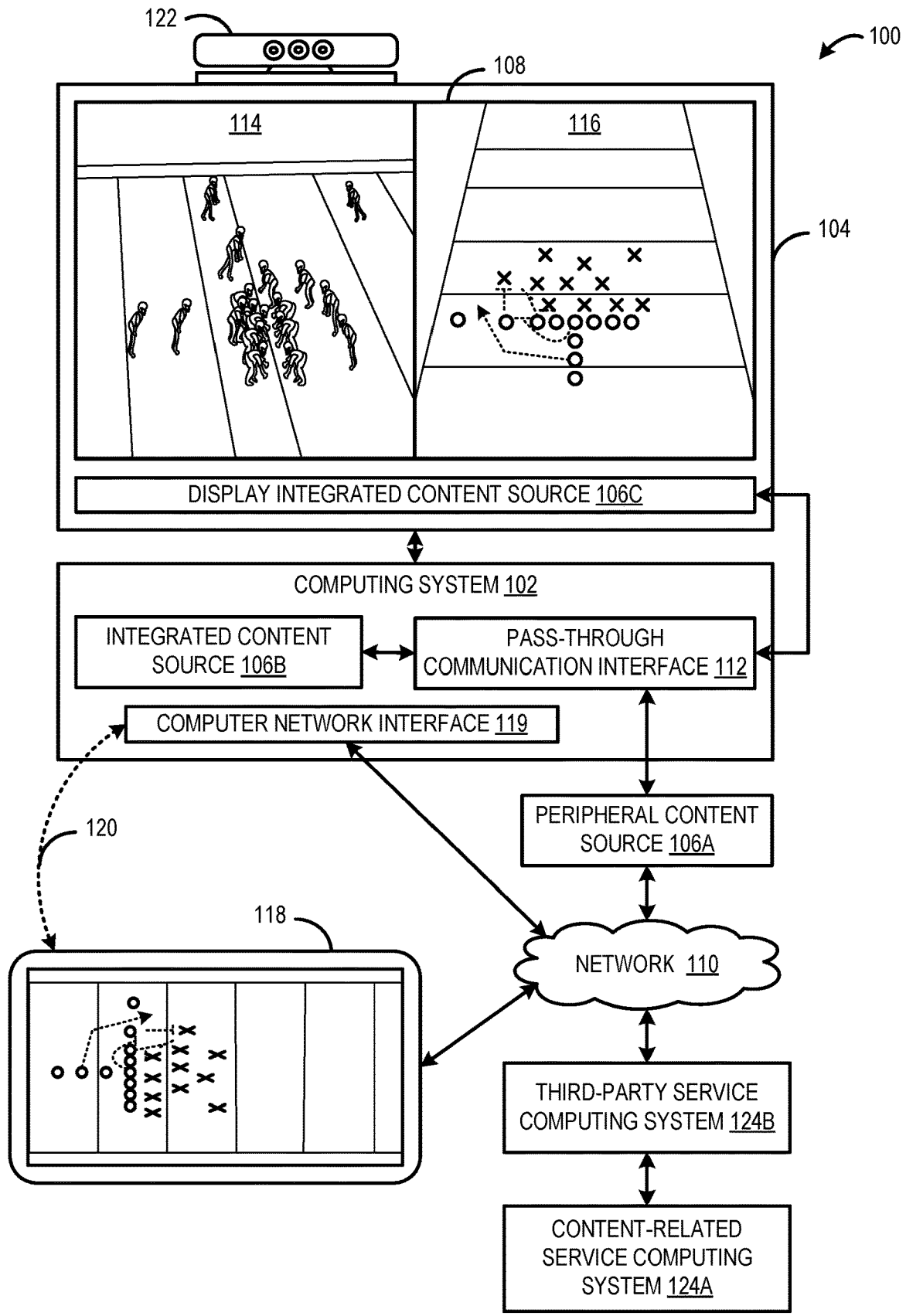
FIG. 1 shows an example computing environment.

FIG. 1 shows a non-limiting example of an entertainment technology environment 100. In particular, FIG. 1 shows a computing system 102 in the form of an entertainment console that may be used to present enhanced sporting event experiences, a variety of different video games, one or more different media content items, and/or execute non-game applications and/or operating systems. Computing system 102 is connected to a display 104 such as a television or a computer monitor, which may be configured to present enhanced and/or unenhanced sporting events, media content, game visuals, non-game computing content, and/or other content to users in entertainment technology environment 100.

An entertainment console is just one example of a suitable computing system, and computing system 102 may take any suitable form without departing from the scope of the present disclosure. For example, computing system 102 may instead be a personal desktop computing device, a laptop computing device, a mobile computing device (e.g., tablet computer or smartphone), a smart television, a peripheral device configured to be connected to a display (e.g., a set-top box), a wearable computing device, a virtual or augmented reality head-mounted display device, or another form of computing device.

Computing system 102 may be configured to provide intermediate control of content provided by a plurality of content sources 106 (e.g., 106A and 106B) for visual presentation via display 104. In particular, computing system 102 may provide a unified graphical user interface (GUI) 108 through which a user may interact to select content from various sources and/or to discover and consume other relevant content. In this way, content from various disparate sources may be accessed through a single user interface. Further, computing system 102 may be configured to present, via GUI 108, supplemental information about each content item in addition to providing an access point to the content item. Further still, computing system 102 may be configured to associate content from different sources with an identified content item. For example, computing system 102 may be configured to display such associated content simultaneously with the identified content item in GUI 108 in order to enhance a viewing experience of the identified content item.

In some implementations, the plurality of content sources 106 may include one or more peripheral content sources 106A, such as external devices attached to computing system 102. Examples of peripheral content sources 106A include, but are not limited to, a cable box, a satellite receiver, a digital television receiver, a DVD player, a Blu-ray player, a set-top box, a media center computer, a digital video recorder, or another peripheral device. Peripheral content sources may be connected to computing system 102 in any suitable manner, including but not limited to, HDMI, Component Video, Thunderbolt, USB, Ethernet, WiFi, and Bluetooth.

In some implementations, the plurality of content sources 106 may include one or more integrated content sources 106B that is/are directly integrated into computing system 102. Examples of integrated content sources 106B include, but are not limited to, an optical drive, a local storage device, an over-air tuner, an IP tuner, a satellite tuner, a cable tuner, or another form of television or broadcast signal tuner.

In some implementations that utilize a detached display, the plurality of content sources 106 may include one or more display integrated content sources 106C that is/are integrated into display 104. Examples of the display integrated content source 106C may include, but are not limited to, an optical drive, a local storage device, an over-air tuner, an IP tuner, a satellite tuner, a cable tuner, or another form of television or broadcast signal tuner.

In some implementations, one or more of the plurality of content sources 106, whether peripheral or integrated, may be network content sources that are configured to receive media content via a computer network 110, such as the Internet.

The plurality of content sources 106 may be configured to provide linear and/or non-linear content for visual presentation via display 104. Linear content may include any suitable form of live or time synchronous content, such as live television programming (e.g., a live-action sporting event that is currently taking place). Linear content may also include any suitable form of time-shifted content, such as previously recorded television programming or video on-demand content. Non-linear content may include data that may be accessed in any order (e.g., web page data, database data, linked data). The plurality of content sources 106 may provide any suitable content to computing system 102 and/or display 104 without departing from the scope of the present disclosure. Moreover, the plurality of content sources 106 may provide any suitable number of different content feeds/video streams to computing system 102 and/or display 104 without departing from the scope of the present disclosure. For example, computing system 102 may receive a plurality of different feeds/video streams of different live-action sporting events, and computing system 102 may be configured to intelligently select which live-action sporting event to visually present via display 104. In another example, computing system 102 may receive a plurality of different feeds of the same live-action sporting event (e.g., different camera angles), and computing system 102 may be configured to intelligently select which feed of the live-action sporting event to visually present via display 104.

Computing system 102 may include video and/or audio signal pass-through functionality (e.g., HDMI pass-through) via a pass-through communication interface 112. In particular, pass-through communication interface 112 may be configured to allow a video and/or audio signal sent from a content source 106 to be directed through computing system 102 to display 104. For example, a broadcast television signal or other audio/video/data signal received at a television tuner (e.g., integrated into display 104 and/or integrated into a set top box or other external content source) and/or other content source may be sent to the computing system 102 via an internal bus, an external cable (e.g., an HDMI cable, coaxial cable, and/or other data cable), and/or a wireless connection. The signal may then pass through computing system 102 to a display device (e.g., display 104) to present content to a user. Such pass-through functionality allows computing system 102 to control transmission of the signal to display 104. In some examples, computing system 102 may pass the signal to the display with minimal or no adjustment of the signal (e.g., passing the raw signal and/or selectively processing the raw signal only to conform to playback constraints of the display). In other examples computing system 102 may selectively append data to the signal (e.g., to present the signal alongside additional information) and/or alter data in the signal (e.g., encode, decode, edit for presentation, remove portions of the signal, and/or otherwise adjust the data in the signal) via pass-through communication interface 112 and/or other processors within computing system 102. Pass-through communication interface 112 may enable additional functionality, such as overlaying GUI 108 with video from the existing video signal and other functionality described in further detail herein.

Computing system 102 (e.g., an operating system, application, program, and/or other software executed by a processor of the computing system in some examples) may recognize the user's cable/satellite/broadcast listings from the user's cable/satellite/broadcast headend data as received via the pass-through communication interface 112. The computing system may additionally or alternatively recognize the listings and/or a currently-viewed program via audio/video signature analysis. Computing system 102 may run a query against the cable/satellite/broadcast service provider to find all programming matching application content (e.g., all football programming for a fantasy football application) that would be available to the user.

Rendering the broadcast directly in an application allows the application to use the results from the query to surface/provide to the user all or a selected subset of relevant programming and to monitor for events of interest to the user on the relevant programming. By recognizing the user's cable/satellite/broadcast listing via the pass-through signal, an analysis of the displayed content, and/or user input specifying a cable/satellite/broadcast provider, the application may identify the channel number of the viewed original program and/or a secondary program (e.g., a program that triggers a notification of an event of interest to the user). The identification of the channel may additionally allow a user to network into and/or otherwise connect to the application running on the computing system 102 (e.g., via a secondary device) so that the user may be presented the broadcast content via the display device responsive to a suitable user input (e.g., a click of a button on a secondary device, to auto change channel for example) or to manually tune the pass-through broadcast content. In this way, a user may use a remote device (e.g., a smartphone, controller, and/or other suitable input device) to provide input to the computing system 102 to instruct the computing system to tune to a selected channel of broadcast data from a content source and display that selected channel in the application via the display device. Further, the user may continue watching the video content and continue using the application without authenticating, subscribing, or signing up to the video content outside of the primary device, and may watch the same content (e.g., live sports games) through the broadcast.

Computing system 102 may include a shell configured to provide GUI 108 that allows users to access (e.g., via voice commands, gesture commands, remote control input, or other input) various operating system (OS) services and applications executed by computing system 102. GUI 108 may be visually organized in any suitable manner without departing from the scope of the present disclosure. For example, GUI 108 may present various destinations or pages in the shell. Such destinations or pages may include different applications and/or content items provided by different sources. For example, content items may include sporting events, movies, TV programs, games, music, and other forms of digital media. In one example, GUI 108 may include a home page providing access to applications, digital content, and other shell destinations. In some cases, the home page may be curated based on preferences, behavior, and previous interactions of a user (or a group of users, e.g., a family).

Computing system 102 may be configured to support execution of a plurality of different applications. For example, GUI 108 may provide support for a diverse ecosystem of applications provided by computing system 102 and/or third-parties. For example, GUI 108 may include a shell destination in the form of an application store or portal for acquiring various applications and/or digital content. Further, acquired (e.g., downloaded) applications may be organized at various shell destinations and/or located or "pinned" on the home page.

Computing system 102 may be configured to support multi-tasking between different applications as well as background services. In one example, computing system 102 may be configured to support switching quickly between different applications that occupy the full screen of GUI 108. In another example, computing system 102 may be configured to display two or more applications simultaneously in a split-screen "snap" mode of GUI 108. In yet another example, computing system 102 may be configured to run services or other tasks in the background while using different applications in the foreground. In some implementations, such applications and background services may correspond to different contextual states of computing system 102. In some implementations, a full screen or snap application may be augmented with graphic and/or sound overlays provided by the operating system and/or another application.

In the illustrated example, GUI 108 is operating in the snap mode in which a television broadcast of a football game 114 (e.g., provided via pass-through communication interface 112 from content source 106) and a companion application 116 providing football statistics of players playing in football game 114 are visually presented simultaneously via display 104.

In some implementations, computing system 102 may be in communication with an auxiliary computing device 118 (e.g., tablet computing device or smartphone) via a computer network interface 119. In one example, computing system 102 may communicate with auxiliary computing device 118 via network 110. In another example, computing system 102 may communicate with auxiliary computing device 118 via a direct communication link 120, such as a radio (e.g., Bluetooth) link. Auxiliary computing device 118 may be configured to present content associated with a content item controlled by computing system 102 and/or visually presented via display 104. In one example, the television broadcast of the football game 114 may be visually presented via display 104 in a full-screen view, and the companion application 116 may be visually presented via the auxiliary computing device 118, or vice versa. The auxiliary computing device 118 may be configured to present any main or auxiliary viewing experience or a portion thereof alone or in cooperation with computing system 102 and/or display 104. Moreover, computing system 102 may be configured to communicate with any suitable number of auxiliary computing devices and/or displays to provide any suitable number of different content items and/or content consumption experiences.

In some implementations, computing system 102 may be in communication with a capture device 122 that audibly and/or visually tracks objects within an observed scene. Capture device 122 may be operatively connected to computing system 102 via one or more wired or wireless interfaces. In one non-limiting example, capture device 122 may include an infrared light source to project infrared light onto the physical space and a depth camera configured to receive reflected infrared light. The capture device also may comprise other sensors, including but not limited to two-dimensional image sensor(s) (e.g., a visible light camera such as an RGB image sensor and/or a grayscale sensor) and one or more microphones (e.g., a directional microphone array).

Computing system 102 may be configured to identify each user in entertainment technology environment 100 based on audio and/or video data received from capture device 122. For example, facial recognition, voiceprint identification, anatomical measurements (e.g., derived from depth map information), and/or other suitable techniques may be used to determine a biometric identity of a user in the entertainment technology environment. In one particular example, voice input directionally identified with a beam forming microphone array may be correlated with any biometric identification discerned using standard and/or depth video to identify a user. It will be understood that user identification can be accomplished in any suitable manner. Furthermore, once a user has been identified, that user may be tracked (e.g., viewing display, providing gesture-based input, providing voice input, providing control device input, and other suitable interactions), via capture device 122. Such tracking may be associated with the user's identity.

The above described features of capture device 122 may be leveraged by computing system 102 to provide various functions to users in entertainment technology environment 100. For example, information from capture device 122 may be used by computing system 102 to provide video and/or voice chat capabilities with remote users. In one example, capture device 122 may capture video and audio data of a user interacting with entertainment technology environment 100. Further, computing system 102 may send captured video and audio data to another remotely located user's computer as part of a video chat session. In some implementations, such video chat functionality may be incorporated into an application that may be executed simultaneously with other applications by computing system 102.

In some implementations, computing system 102 may be configured to communicate, via computer network interface 119, with a plurality of remote service computing systems 124 (e.g., 124A, 124B) connected to network 110. For example, the plurality of remote service computing systems 124 may be configured to provide supplemental information, perform data analysis/processing, and/or perform other operations related to controlling or enhancing presentation of a content item.

In the illustrated example, a content-related service computing system 124A that is affiliated with a content item may provide supplemental information about the content item. Continuing with the example of the football game, the content-related computing service computing system 124A may provide play-by-play information as the football game occurs. In one example, the content-related service computing system 124A is a football game reporting computing system operated or associated with the National Football League (NFL) to provide game data to requesting computers via various APIs.

A third-party service computing system 124B may receive the content item information from content-related service computing system 124A. Third-party service computing system 124B may be configured to perform processing, analysis, or other operations on the content item information to generate supplemental content or other information that may be sent to computing system 102 to enhance a viewing experience of the content item. Continuing with the example of the football game, third-party service computing system 124B may perform analysis on game data (e.g., play-by-play information) to calculate derivative data and auxiliary information about different teams and/or players that are participating in the football game. Third-party service computing system 124B may be configured to send the auxiliary information to computing device 102 for presentation in companion application 116 (e.g., a sports scores application). In another example, third-party service computing system 124B may provide a fantasy-style statistical game that a user may participate in while viewing the football game.

In some implementations, information pertaining to real-world sporting events, such as play-by-play information of a football game, may be obtained through the use of a plurality of cameras, sensors, and/or other information trackers. Such information trackers may take the form of motion sensors embedded in a gameplay field/court/arena/area, and/or cameras (including 3D depth cameras, stereoscopic cameras, infrared cameras, etc.) mounted in and around the gameplay area and configured to monitor gameplay events. Additionally, information trackers (including, for example, RFID chips) may be worn by/embedded on real-world game players/coaches/officials, game balls and/or other objects, game landmarks, etc., and each may include a unique identifier, signature, and/or other method for specifying the unique entity with which the information tracker is associated. Information trackers may further comprise biometric sensors worn by each real-world game player/coach/official, and configured to measure one or more biometric parameters, including heart rate, respiration rate, blood pressure, metabolic rate, kilocalories burned, as well as any other suitable biometric information. Virtually any type of information tracker may be used, and such information trackers may be configured to obtain virtually any information pertaining to a real-world sporting event.

Data collected from these information trackers may be subjected to one or more processing/analysis steps in order to generate a variety of useful information pertaining to the real-world sporting event. Such processing/analysis may be performed by content-related service computing system 124A and/or third-party service computing system 124B prior to the information being sent to the computing system 102. For example, information trackers may determine which real-world players/coaches/officials are currently in the sporting event, as well as their positions relative to each other, to any game balls or other important objects, and/or to any gameplay landmarks. Such information may be usable to determine, for example, which players are currently participating in the game (e.g., on the field or court), how fast each player/game ball is moving, which player is in possession of a game ball, a length of time a particular player is in possession of a game ball, a distance travelled by a player and/or game ball/important game object during a period of time, etc.

Information as described above may be uploaded to one or more network services/content sources, and may be accessible by a plurality of hardware/computing devices. For example, such information may be provided by content-related service computing system 124A and/or third-party service computing system 124B to one or more content sources 106, and further delivered from the one or more content sources 106 to a computing device such as, for example computing device 102 and/or auxiliary computing device 118. For example, such information may be presented by GUI 108 via an application program interface (API), as part of a dedicated data stream, and/or as metadata from a content stream. As such, the information presented by GUI 108 may be based at least in part on the information collected by the information trackers. Further, such data may be collected, uploaded, and accessed substantially in real time. For example, GUI 108 may present information retrieved from a content source 106 via an API as the information updates, allowing the information presented by GUI 108 to update at substantially the same time as real-world events unfold (allowing for necessary processing and/or transmission time).

In some implementations, third-party service computing system 124B and computing system 102 may be affiliated with a same platform or computing ecosystem. In some such implementations, third-party service computing system 124B may be configured to provide the supplemental information to any computing system that is affiliated with that platform or computing ecosystem. For example, the third-party computing system 124B may include a content distribution network through which the supplemental information may be distributed to the various computing systems within the computing ecosystem. Other third-party service computing systems 124B may be used to provide supplemental information to other computing ecosystems. In some implementations, the same third-party computing system 124B may provide information to different computing ecosystems, for example via an ecosystem agnostic API.

In some implementations, content-related service computing system 124A may send the content item information directly to computing system 102 without any intervention from third-party service computing system 124B.

The above described features of computing system 102 may be leveraged to provide functionality related to controlling presentation of media content. More particularly, computing system 102 may provide functionality related to enhancing presentation of media content beyond what is provided by a content source.

In some implementations, computing system 102 may be configured to enhance presentation of a live-action sporting event, by providing auxiliary information/notifications that are generated separate from a video stream of the live-action sporting event. More particularly, computing system 102 may be configured to visually present real-time statistical data and/or predictions of upcoming aspects that occur during the live-action sporting event. For example, statistical data and/or predictions of aspects of a live-action sporting event may be included in an overlay that is visually presented simultaneously with a broadcast feed/video stream of the live-action sporting event. In another example, statistical data and/or predictions may be provided by a companion application that is visually presented simultaneously (e.g., side-by-side, picture-in-picture) with a broadcast feed/video stream of the live-action sporting event. In some implementations, the statistical data and/or predictions can be presented with time-shifted content, thus allowing a viewer to simulate a live viewing experience after a sporting event has already taken place. In any case, computing system 102 may generate and/or relay the auxiliary information/notifications separate from the video stream received by computing system 102 from a content source 106.

In some implementations, different computing systems may enhance the same live-action sporting event differently for different users by visually presenting different auxiliary information/notifications based on a different state or condition of the computing system and/or different criteria/preferences of one or more users associated with the computing system.

These and other concepts are described herein using an example scenario of viewing a football game. However, such concepts may be broadly applicable to any suitable live event, sporting or otherwise.

Figure 2:
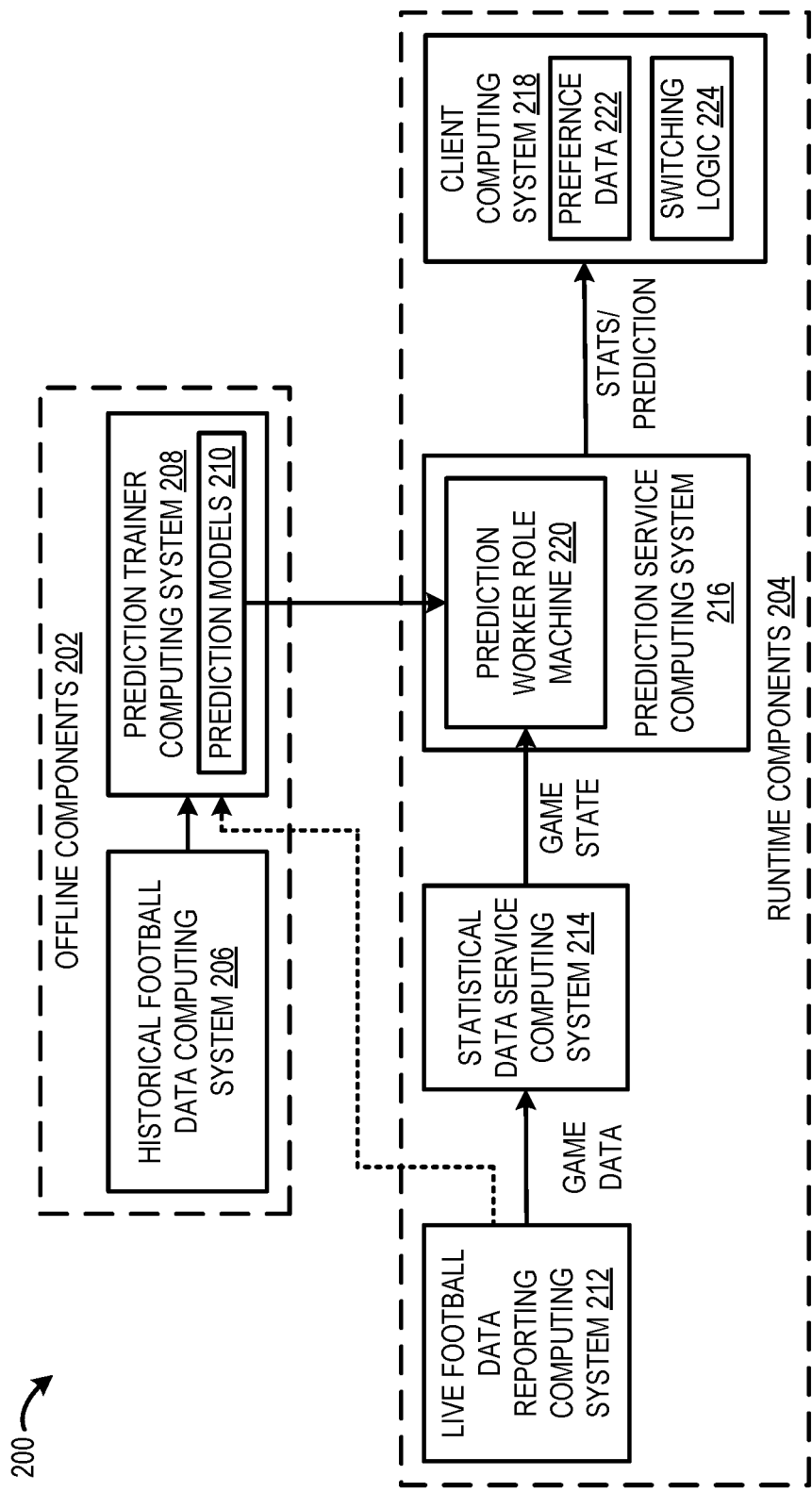
FIG. 2 shows an example computing system configured to provide sport-specific statistics and/or predictions for live-action sporting events.

FIG. 2 shows an example computing system 200 that may be configured to provide real-time statistical data and/or predictions for one or more live football games. Computing system 200 may include offline components 202 configured to perform operations asynchronously relative to live events, and runtime components 204 configured to perform operations as live events occur. Offline components 202 may include a historical football data computing system 206 and a prediction trainer computing system 208. Historical football data computing system 206 may be configured to store a historical account of football game data (also referred to herein as live-action sporting event data) from previously played NFL games. Prediction trainer computing system 208 may retrieve game data (e.g., play-by-play data) for games played during a designated period from the historical football data computing system 208 via APIs (e.g., a Schedule API and a Play-By-Play API). In one example, prediction trainer computing system 208 may retrieve game data for every football game played in the NFL over the two most recent seasons. Game data for any suitable number of NFL seasons may be retrieved from the historical football data computing system 208 for prediction model training purposes.

Prediction trainer computing system 208 may be configured to parse the game data to identify particular characteristics that may be used to generate different prediction models. In one example, the game data may be provided in a JavaScript Object Notation (JSON) format data stream including a season type (e.g., preseason, regular season, playoff), game ID, start time of play, starting yard line (e.g., OAKLAN 20 yard), play number of drive number (e.g., play 1 of drive 5), game clock, indication of whether or not a penalty on occurred on the play, down, quarter, yards to goal line (if the starting yard line is within 10 yards of the goal line), and human-generated play description (e.g., Carr pass to Cooper for 4 yards). The prediction trainer computing system 208 may parse the game data into columns of a matrix of game information.

In some implementations, the prediction trainer computing system 208 may calculate derivative data and/or statistics not provided from the historical football data computing system 206. In one example, derivative data includes a current score differential at a start of each play and a current field position relative to a goal line. In another example, the prediction trainer computing system 208 may be configured to label plays that lead to a touchdown while in the Redzone (i.e., 20 yards or less from the goal line) in a column for Redzone TDs. This particular label may not be provided by the historical football data computing system 206, and instead could be additionally provided by the prediction trainer computing system 208. The prediction trainer computing system 208 may add additional derived statistics as separate columns of the matrix of game information. The prediction trainer computing system 208 may calculate any suitable derivative data, statistics, and/or other information not provided by the historical football data computing system 206 from the live-action sporting event data.

In some implementations, the prediction trainer computing system 208 may parse game data into individual player data. For example, the matrix of game information may be organized to identify each play of a game in which a particular player is involved. Further, the matrix of game information may include separate columns for statistics of individual players.

The prediction trainer computing system 208 may extract other characteristics of the game beyond play-by-play information from the game data. For example, the prediction trainer computing system 208 may identify the teams participating in the game, the rosters of players on the teams, the coaches of the teams, the time at which the game was played, the location of the game, the weather conditions during the game/play, and other suitable game characteristics. The prediction trainer computing system 208 may add the additional game characteristics as separate columns of the matrix of game information.

Further, the prediction trainer computing system 208 may be configured to, in an offline process, employ a supervised machine-learning algorithm to train one or more prediction models 210 based on the parsed game data and derivative data. The one or more prediction models 210 may be trained using any suitable machine learning algorithms including, but not limited to, learning trees (e.g., Boosted, Bagging, Random forest), support vector machines, neural networks, and other suitable machine-learning algorithms.

In one example, the one or more prediction models 210 may be trained using a machine learning toolset that has a library of classification training algorithms. Example parsed game data used to train one or more of the plurality of prediction models 210 may include, but is not limited to, "SeasonType", "teamId", "GoalToGo", "Quarter", "Down", "YardsToGo", "GameClock", "FieldPos", and "ScoreDiff."

In one example, prediction trainer computing system 208 may train a Redzone prediction model using the following fields: "SeasonType", "teamId", "GoalToGo", "Quarter", "Down", "YardsToGo", "GameClock", "FieldPos", "ScoreDiff", and "RedzoneTD." In one example, the prediction trainer computing system 208 may use 80% of the parsed play-by-play data to train the Redzone prediction model and 20% of the parsed play-by-play data to test against the trained model. For example, the Redzone prediction model may be a boosted decision tree model with a label set to "RedzoneTD."

In another example, prediction trainer computing system 208 may train a Pass vs Run prediction model using the following fields: "SeasonType", "teamId", "GoalToGo", "Quarter", "Down", "YardsToGo", "GameClock", "FieldPos", "ScoreDiff", and "Pass/Run." In one example, prediction trainer computing system 208 may use 80% of the parsed play-by-play data to train the Pass/Run prediction model and 20% of the parsed play-by-play data to test against the trained model. For example, the Pass/Run prediction model may be a two-class boosted decision tree model with a label set to "Pass/Run."

In another example, prediction trainer computing system 208 may train a Likely Target prediction model using fields that are parsed from a "Play Description" of each play to identify players involved in the play. In particular, prediction trainer computing system 208 may create a table to track the number of Run vs Pass plays that a player was involved with.

The above described prediction models are provided as examples. However, any suitable prediction model may be trained in any suitable manner without departing from the scope of the present disclosure. Virtually any state-based characteristic of a game may be used to train a model. In addition to the fields described above, other suitable fields include "Coach", "Quarterback", "Temperature", "WindSpeed", "Snow", "Rain", and "Home/Away".

Continuing with FIG. 2, runtime components 204 may include a live football data reporting computing system 212, a statistical data service computing system 214, a prediction service computing system 216, and a client computing system 218. Runtime components 204 may cooperate to provide real-time statistical data and predictions for a live football game as the football game is being presented at client computing device 218. In particular, during the live football game statistical data service computing system 214, may ingest real-time game data received from live football data reporting computing system 212 (e.g., via an API). Statistical data service computing system 214 may be configured to analyze the real-time game data to generate statistical data that may be presented at client computing device 218 as well as to update a prediction worker role machine 220 of the prediction service computing system 216 with a current game state of the football game (e.g., clock, down, quarter, score, possession, yards to go).

Prediction worker role machine 220 may be configured to load the saved prediction models 210 and query the prediction models using the current game state to make predictions. Example predictions that may be made for any given play may include, but are not limited to, a Redzone TD prediction that indicates a percent (%) chance that the next play, when in the redzone, will lead to touchdown, a Run vs Pass prediction that indicates a percent (%) chance that the next play will be a run or a pass, a Drive prediction that indicates where on the field (e.g., a particular yardage marker) a current drive is likely to end, a Yardage Gain/Loss prediction that indicates a number of yards the current play/drive is predicted to gain/lose, a 1st Down prediction that indicates a percent (%) chance that the current play will achieve a first down, and a Likely Target Prediction that indicates which player is likely to receive/carry the ball (or otherwise be involved) on the current play. In one example, prediction worker role machine 220 may be configured to generate predictions for every second that a game clock updates.

In some implementations, live football data reporting computing system 212 may send game data generated from a football game that is currently taking place to prediction trainer computing system 208, and prediction trainer computing system 208 may update the prediction models 210 based the game data. In other words, the prediction models 210 may be dynamically updated to account for information produced by a football game that is currently taking place. Such dynamic updating of the prediction models may be dependent on the processing resources of prediction trainer computing system 208.

Prediction service computing system 216 may provide predictions for any suitable aspect that takes place during any suitable type of live-action sporting event. Prediction service computing system 216 may provide predictions for any suitable number of football games (or other live events) at any given time. For example, multiple NFL football games may be played simultaneously, and prediction service computing system 216 may provide predictions for each of the plurality of football games to client computing device 218.

Furthermore, prediction service computing system 216 may provide auxiliary game and/or player information to client computing device 218. The auxiliary game and/or player information may include information passed along from live football data reporting computing system 212 and/or may include derivative data and/or statistics calculated from the game data received from live football data reporting computing system 212.

In one example, prediction service computing system 216 may store multiple different predictions (e.g., run/pass prediction, scoring prediction, targeted player prediction) generated for a given game clock time of a given game together in a binary large object (BLOB). The BLOB may allow the predictions to be sent to client computing system 218 in an efficient manner. Moreover, client computing system 218 may be representative of any number of client computing devices that receive predictions generated by prediction service computing device 216. Accordingly, in some implementations, prediction service computing system 216 may provide the BLOB to a content delivery network (CDN) to distribute the BLOB to various client computing systems.

Client computing device 218 may visually present auxiliary information/notifications including predictions received from prediction service computing system 216 simultaneously with a video stream of a corresponding live-action sporting event.

In some implementations, client computing system 218 may be configured to receive a plurality of broadcast feeds/video streams of different football games (or other live-action sporting events) currently taking place. For example, the plurality of broadcast feeds/video stream may be received via one or more content sources 106 of FIG. 1. Client computing system 218 may be configured to, for each of two or more of the plurality of football games, receive a prediction for an upcoming play of that football game prior to commencement of the upcoming play. In some cases, client computing system 218 may receive predictions for every football game that is being broadcast/currently taking place. Client computing system 218 may use these predictions of upcoming plays that have not taken place to intelligently select a football game of interest from the plurality of football games. In other words, client computing system 218 may make a decision based on pending predictions for plays that have not taken place yet. Once a play has occurred the prediction expires and is no longer pending/considered for the selection decision. The football game of interest may be a particular football game that is predicted to have an event occur in an upcoming play that is deemed to be interesting or desirable to view over events occurring in other football games concurrently taking place. Client computing system 218 may provide a selection notification of the live-action football game of interest.

In some implementations, providing the selection notification may include visually presenting (e.g., via display 104 of FIG. 1) a proposal to visually present a video stream of the live-action sporting event of interest. For example, a notice may pop-up in the corner of the display stating, 'The Raiders are predicted to score on the next play. Would you like to watch?' In some implementations, providing the selection notification may include automatically visually presenting (e.g., via display 104 of FIG. 1) a video stream of the live-action sporting event of interest. This may include automatically switching from a video stream of a football game currently being visually presented to the video stream of the football game of interest. In some implementations, providing the selection notification may include providing a notification of the prediction for the event of interest, even if a video stream of another football game is currently being visually presented. The selection notification may take any suitable form and/or may include any suitable computing operations that notify a viewer of the football game of interest and/or the prediction of the upcoming aspect.

In some implementations, client computing system 218 may be configured to select a football game of interest based on user preference data 222 of a user associated with client computing system 218 and the pending predictions for upcoming plays of different football games. User preference data 222 may include any suitable data indicating a preference of a user or group of users (e.g., a family) for particular teams and/or players that may be used to select a video stream of a football game of interest. For example, user preference data 222 may include a user's favorite teams, a user's favorite players, football players on a user's fantasy football teams, football players on a friend's fantasy football team (or players of other fantasy teams in a user's fantasy football league). User preference data 222 may be obtained in any suitable manner including, but not limited to, user input and previous viewing history.

In one example, if two different football teams are predicted to have a high probability of scoring in an upcoming play and the user preference data 222 indicates that the user favors one team over the other, then client computing system 218 may select the football game that involves the favored team as the football game of interest. In another example, client computing system 218 may select football games that include players on a user's fantasy football team when those players are determined to likely be involved in a predicted play. Client computing system 218 may switch between feeds/video streams of different players and/or different games in any suitable manner.

In some implementations, client computing system 218 may be configured to receive a plurality of different views/perspectives/camera angles of a single football game. Client computing system 218 may be configured to use predictions and/or user preference data 222 to intelligently select which view to visually present (e.g., via display 104 of FIG. 1). For example, if a viewer's favorite player is predicted to have a high likelihood of being involved in a play based on a prediction provided by prediction service computing system 216, then client computing system 218 may select a view that focuses on that player for the entire play. In another example, if a player on a viewer's fantasy football team is predicted to be involved in a play, then client computing system 218 may select a view that focuses on that player for the entire play. In another example, user preference data may include a viewer's favorite or preferred view of certain types of plays (e.g., run or pass), and client computing system 218 may select a view corresponding to the prediction of the type of play. For example, a viewer may prefer to watch a running play from an overhead view and a pass play from an endzone view, and client computing system 218 may store such preferences and switch the view based on a prediction that the type of play is likely to occur.

In implementations where client computing system 218 switches between different video streams of different football games and/or different views of a single football game, client computing system 218 may include switching logic 224 configured to determine appropriate timing to switch between different games or views within a particular game. In one example, switching logic 224 may be configured to switch to a different video stream after a play has concluded. In another example, switching logic 224 may be configured to switch to a different video stream after a scoring event has occurred. In another example, switching logic 224 may be configured to switch between different video feeds during a single play. For example, switching logic 224 may be configured to switch between different camera angles to follow a particular preferred player during a play. Switching logic 224 may be configured to switch video streams in any suitable manner.

In some implementations, client computing system 218 may be configured to intelligently select particular auxiliary information/notifications for a football game based on user preference data 222. Client computing system 218 may generate such auxiliary information/notifications separate from a video stream/live feed/broadcast of the event that is received by client computing system 218. Further, client computing system 218 may visually present the auxiliary information/notifications as a layer that is overlaid on the video stream or visually presented simultaneously (e.g., via a companion application) with the video stream. In other words, each viewer that watches a same live event, at a same time, and from a different computing system may be visually presented with auxiliary information/notifications that are tailored to the preferences of the viewer and different from auxiliary information/notifications that are visually presented to other viewers having different preferences.

In some implementations, client computing system 218 may be configured to intelligently select particular statistical data and/or predictions for visual presentation (e.g., via display 104 of FIG. 1) based on user preference data 222. For example, client computing system 218 may use a viewer's personal preferences to select which statistical data and/or predictions to present to the viewer. In one example, client computing system 218 may identify a viewer's favorite players, and present statistical data and/or predictions related to those players. In another example, client computing system 218 may identify a player's favorite teams, and present statistical data and/or predictions related to those teams. In another example, client computing system 218 may recognize that the viewer participates in a fantasy football game in which the viewer manages a fantasy football team that includes football players selected from different real-life football teams. Client computing system 218 may present statistical data and/or predictions related to those players on the viewer's fantasy football team. By providing statistical data and/or predictions that are curated to the preferences of a particular viewer (or group of viewers), presentation of a content item (e.g., a football game) may be enhanced in a manner that is particularly meaningful to the particular viewer.

In one example, historical football data computing system 206 and live football data reporting computing system 212 correspond to content-related service computing system 124A of FIG. 1; prediction trainer computing system 208, statistical data service computing system 214, and prediction service computing system 216 correspond to third-party service computing system 124B of FIG. 1; and client computing system 218 corresponds to computing system 102 of FIG. 1.

Although prediction service computing system 216 is described as providing statistical data and/or predictions for a football game, prediction service computing system 216 may be configured to provide any suitable auxiliary information/notifications related to a live event, sporting or otherwise.

Figure 3:
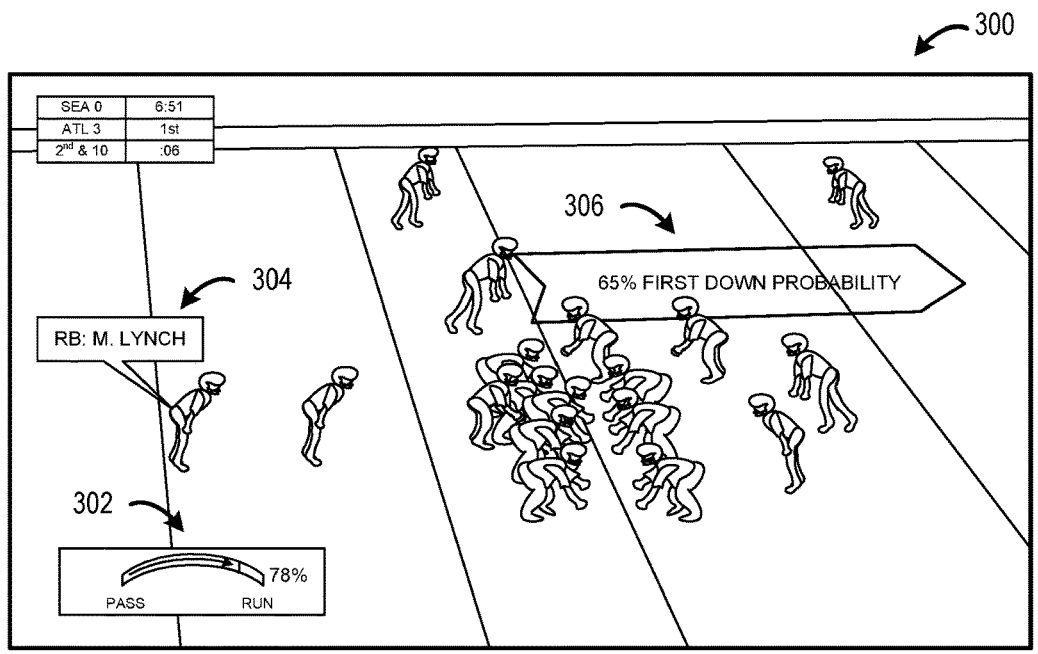
FIGS. 3-5 show example auxiliary information and predictions visually presented simultaneously with video of a live-action sporting event.
Figure 4:
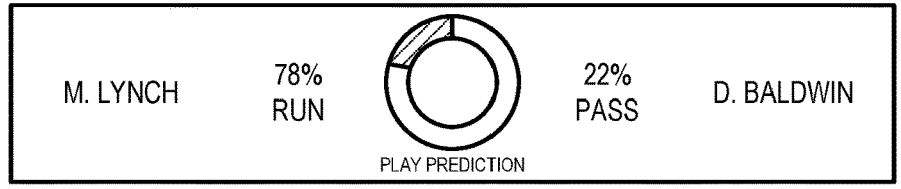
Figure 5:
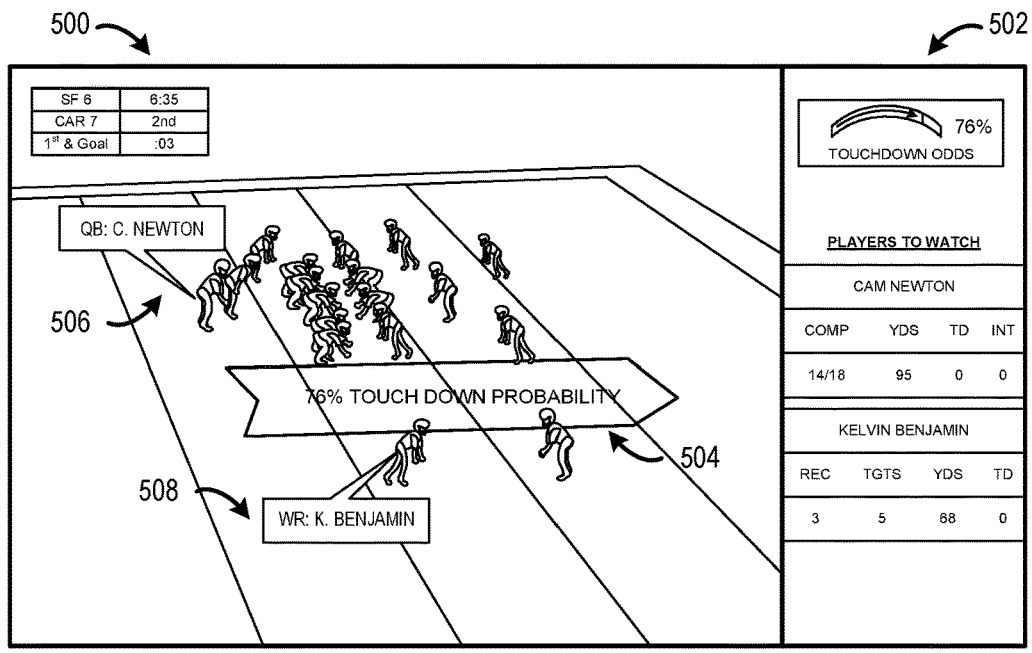

Computing system 102 may visually present statistical data and/or predictions in any suitable manner. FIGS. 3-5 show example graphical objects that may be overlaid on (or presented simultaneously with) a live video stream of a football game that is visually presented via display 104. In particular, computing system 102 and/or third-party service computing system 124B may be configured to generate the graphical objects separately from the video stream that may be received from a content source. Note that the graphical objects need not be embedded in the live video stream when the live video stream is received by computing system 102. However, in some embodiments, the third-party service computing system 124B may embed the graphical objects in a live video stream.

FIG. 3 shows an example in-game prediction scenario. In this scenario, a video stream 300 of a football game between Seattle and Atlanta is visually presented. In the football game, there is 6:51 left in the first quarter, and Seattle has possession of the football with 68 yards to reach the endzone. Before the next play starts, a run/pass prediction object 302 is overlaid on the video stream 300. Run/pass prediction object 302 indicates a likelihood that the next play will be a run or a pass. In this example, run/pass prediction object 302 indicates that there is a 78% chance that Seattle will run the ball on the next play. In one example, the run/pass predication may be provided by prediction service computing system 216 of FIG. 2.

Further, before the next play, a player highlight object 304 may be overlaid on the video stream 300. Player highlight object 304 may indicate a player that is likely to be involved in the next play based on the run/pass prediction and/or other statistical data. In this example scenario, running back Marshawn Lynch is highlighted with player highlight object 304, because a prediction specifies that there is a high probability that he will be involved in the next play. Player highlight object 304 may be used to point out to a viewer which players to watch during the next play. In one example, Marshawn Lynch may be identified from the play-by-play data provided by live football data reporting computing system 212 of FIG. 2.

Further, before the next play, a first down prediction object 306 may be overlaid on the video stream 300. First down prediction object 306 indicates a likelihood that Seattle will achieve a first down on the next play. In this example, first down prediction object 306 indicates that there is a 65% chance that Seattle will achieve a first down on the next play. In one example, the first down predication may be provided by prediction service computing system 216 of FIG. 2.

In some implementations, various graphical objects may be selectable via user input to provide additional detailed information related to the information visually presented via the graphical object. FIG. 4 shows an example detailed information object 400 that may be displayed responsive to selection of a run/pass prediction object 302 of FIG. 3. In particular, detailed information object 400 indicates which players are predicted to be likely involved in the upcoming play depending on which type of play occurs. In this case, if a run play occurs, then Marshawn Lynch will likely be involved in the play. Alternatively, if a pass play occurs, then Doug Baldwin will likely be involved in the play. Detailed information object 400 may be visually presented in any suitable manner. In one example, detailed information object 400 may be visually presented as an overlay on video stream 300 of FIG. 3. In another example, detailed information object 400 may be visually presented in a companion application that is visually presented simultaneously with video stream 300 via display 104. For example, the companion application may be a virtual game tracking application. In another example, detailed information object 400 may be visually presented on auxiliary computing system 118 of FIG. 1.

The above described graphical objects may be visually presented for any suitable duration. For example, the graphical objects may be visually presented in between plays such that before each play, one or more graphical objects may indicate different statistical data, highlighted players, and/or predictions.

Furthermore, in some implementations, after a play has occurred, graphical objects may be visually presented that indicate whether or not a prediction was correct, where applicable. For example, if during the next play, Marshawn Lynch receives the ball on a running play and rushes down the middle for 15 yards, then a graphical object indicating that the run/pass prediction was CORRECT would be visually presented. On the other hand, if during the next play, Doug Baldwin catches a pass for 3 yards, then a graphical object indicating that the run/pass prediction was INCORRECT would be visually presented. Subsequently, before the next play starts, a new set of graphical objects could be visually presented as overlays on the video stream.

In some implementations, results of the predictions may be provided as feedback to prediction service computing system 216 (shown in FIG. 2), and such feedback may be used by prediction trainer computing system 208 to update prediction models 210. Accordingly, prediction models 210 may be made more refined over time as more data is collected.

FIG. 5 shows another in-game prediction scenario. In this scenario, a video stream 500 of a football game between San Francisco and Carolina and a game center companion application 502 are simultaneously visually presented. In the football game, there is 6:35 left in the second quarter, and Carolina has possession of the football with 8 yards to reach the endzone. Before the next play starts, a touchdown prediction object 504 is overlaid on the video stream 500. Touchdown prediction object 504 indicates a likelihood that the current drive will result in a touchdown. In this example, touchdown prediction object 504 indicates that there is a 76% chance that Carolina will score a touchdown in the current drive. In one example, the touchdown predication may be provided by prediction service computing system 216 of FIG. 2.

Further, before the next play, player highlight objects 506 and 508 may be overlaid on the live video stream 500. Player highlight objects 506 and 508 may indicate players that are likely to be involved in the next play. In this example scenario, quarterback Cam Newton and wide receiver Kelvin Benjamin are highlighted with player highlight objects 506 and 508, respectively. In one example, Cam Newton and Kelvin Benjamin may be identified from the play-by-play data provided by live football data computing system 212 of FIG. 2.

Further, before the next play, game center companion application 502 may visually present the touchdown prediction for the next play, as well as profiles for each of the highlighted players likely to be involved in the next play. The profiles for each of the highlighted player may include images of the players and statistical data for the players in the current game. Game center companion application 502 may visually present any suitable information related to the football game being visually presented via the video stream 500. In some implementations, only game center companion application presents the information, and no overlays are added to the live video stream.

Figure 6:
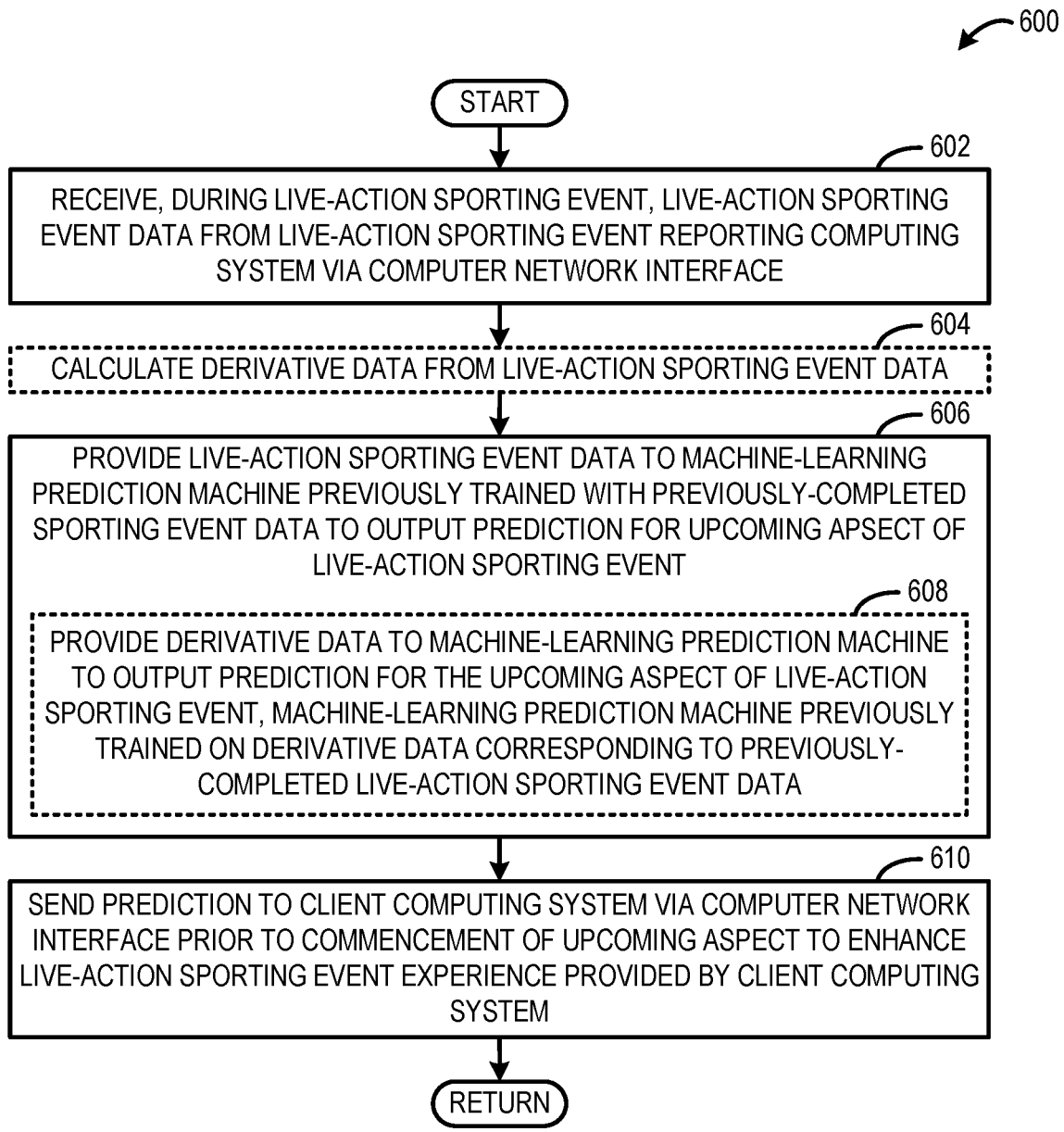
FIG. 6 shows an example method for making a prediction for a live-action sporting event.

FIG. 6 shows an example method 600 for making predictions for a live-action sporting event. For example, the method 600 may be performed by third-party service computing system 124B shown in FIG. 1, prediction service computing system 216 shown in FIG. 2, computing system 800 shown in FIG. 8, or another suitable service computing system.

At 602, the method 600 includes receiving, during a live-action sporting event, live-action sporting event data from a live-action sporting event reporting service computing system via a computer network interface. In one example, the live-action sporting event data may be retrieved from the reporting service computing system via one or more APIs.

In some implementations, at 604, the method 600 optionally may include calculating derivative data from the live-action sporting event data. In one example, the live-action sporting event data may include the current score of a game from which a scoring differential for a particular team may be calculated as derivative data. The scoring differential may then be used to determine a prediction.

At 606, the method 600 may include providing the live-action sporting event data to a machine-learning prediction machine to output a prediction for an upcoming play of the live-action sporting event. The machine-learning prediction machine may be previously trained with previously-completed live-action sporting event data. In some implementations where derivative data is calculated, the method 600 optionally may include providing the derivative data to the machine-learning prediction machine to output a prediction for an upcoming play. In this case, the machine-learning prediction machine may be previously trained on derivative data corresponding to previously completed live-action sporting event data. In other words, the prediction may be determined based on the live-action sporting event data and the derivative data.

In one example in which the live action sporting event is a football game, the machine-learning prediction machine may output a prediction that includes one or more of a probability of the upcoming play being a run play, a probability of the upcoming play being a pass play, a probability of a scoring event occurring in the upcoming play, and/or a probability of an identified player being involved in the upcoming play. Such predictions are meant to be non-limiting examples. The machine-learning prediction machine may output any suitable prediction for any suitable aspect of a live-action event.

At 610, the method 600 may include sending the prediction to a client computing system via the computer network interface prior to commencement of the upcoming play to enhance a live-action sporting event experience provided by the client computing system.

Although the prediction concepts are described in terms of a football game, such concepts may be broadly applicable to other live-action sporting events. For example, such concepts may be applied to game flow in other sporting events. In one example, during a soccer match, a probability of a goal being scored may be predicted based on a game state derived from live-action soccer data, such as a score differential, remaining time, which team poses the ball, positions of players on the field, position of the ball on the field, etc. In another example, during a basketball game, a probability of a basket being scored may be predicted in a similar manner based on a game state derived from live-action basketball data. Further, predictions may be made for set plays when applicable. In one example, during a soccer match, a probability of scoring a goal off of a corner kick may be predicted. In another example, during a basketball game, a probability of scoring a basket off of an inbounds play may be predicted. Any suitable prediction based on any suitable game state of any suitable live-action sporting event may be made using the concepts described herein without departing from the scope of the present disclosure.

Figure 7:
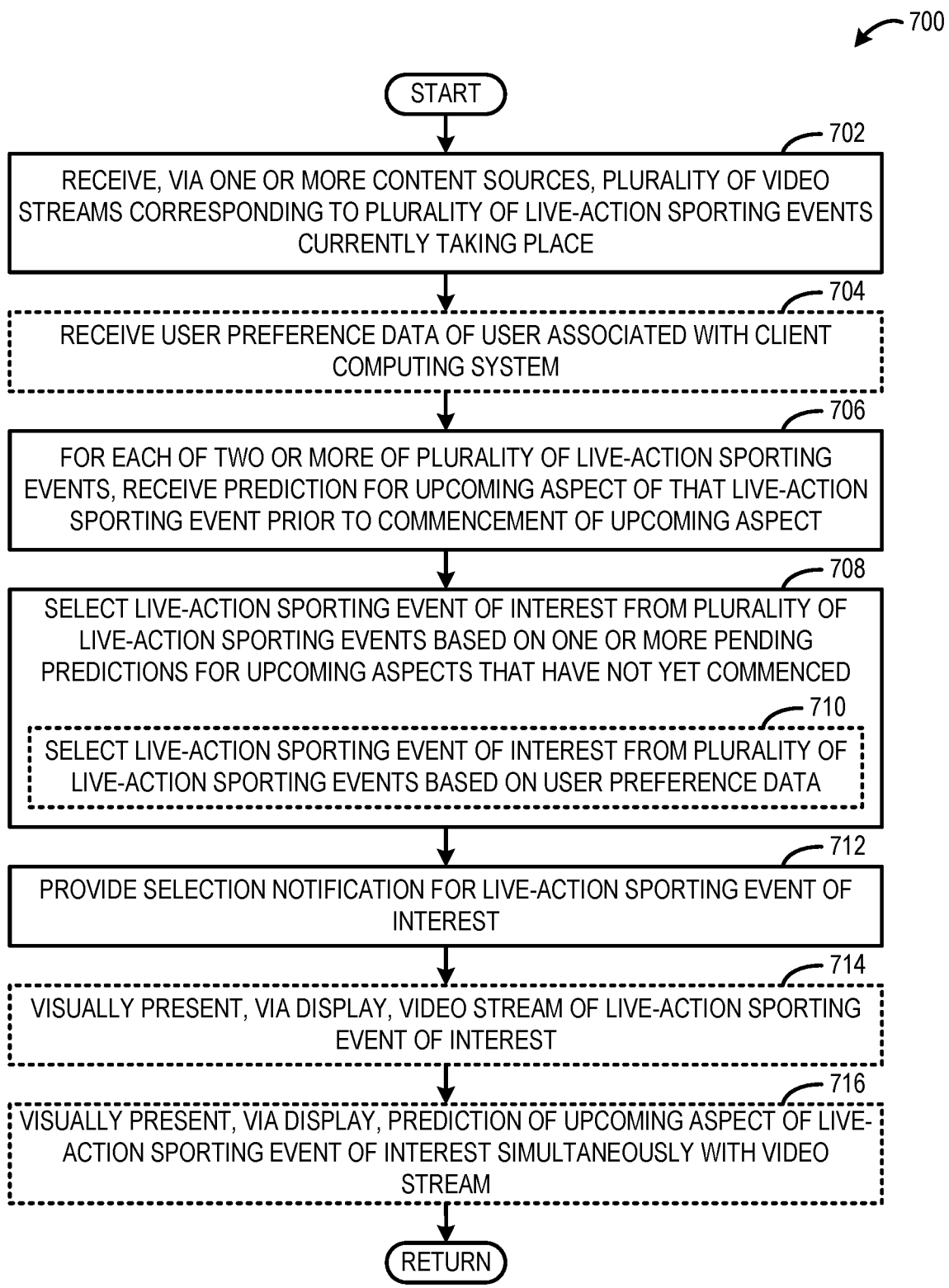
FIG. 7 shows an example method for selecting a live-action sporting event of interest based on pending predictions of upcoming aspects of different live-action sporting events.

FIG. 7 shows an example method 700 for selecting a live-action sporting event of interest based on pending predictions of upcoming aspects of different live-action sporting events. For example, the method 700 may be performed by client computing system 118 shown in FIG. 1, client computing system 218 shown in FIG. 2, computing system 800 shown in FIG. 8, or another suitable client computing system and/or by third-party service computing system 124B.

At 702, the method 700 includes receiving, via one or more content sources, a plurality of video streams corresponding to a plurality of live-action sporting events currently taking place. For example, the plurality of video steams may include different live-action football games currently taking place.

In some implementations, at 704, the method 700 optionally may include receiving user preference data of a user associated with the client computing system. For example, the user preference data may include one or more of a favorite team of the user, a favorite player of the user, and a player on a fantasy team of the user.

At 706, the method 700 includes for each of two or more of the plurality of live-action sporting events, receiving a prediction for an upcoming aspect of that live-action sporting event prior to commencement of the upcoming aspect. For example, the prediction may be output from a machine-learning prediction machine previously trained with previously-completed sporting event data, such as machine-learning prediction machine 220 of prediction service computing system 216 shown in FIG. 2.

At 708, the method 700 includes selecting a live-action sporting event of interest from the plurality of live-action sporting events based on one or more pending predictions for upcoming aspects that have not yet commenced. In one example, the prediction includes a probability of a scoring event occurring during the upcoming aspect, and the live-action sporting event of interest is selected based on having a highest probability of a scoring event occurring during the upcoming aspect.

In some implementations, at 710, the method 700 optionally may include selecting a live-action sporting event of interest from the plurality of live-action sporting events based on the user preference data. In other words, in this case, the live-action sporting event of interest may be selected based on the prediction and the user preference data.

At 712, the method 700 includes providing a selection notification for the live-action sporting event of interest. In one example, providing the selection notification includes visually presenting, via a display, a proposal to visually present a video stream of the live-action sporting event of interest. In another example, providing the selection notification includes automatically visually presenting, via a display, a video stream of the live-action sporting event of interest. The selection notification may be provided in any suitable manner.

In some implementations, at 714, the method 700 optionally may include visually presenting, via a display, a video stream of the live-action sporting event of interest.

In some implementations, at 716, the method 700 optionally may include visually presenting, via the display, the prediction of the upcoming aspect of the live-action sporting event of interest simultaneously with the video stream. In one example, the prediction is visually presented as an overlay on a video stream of the live-action sporting event. The overlay may be generated by the client computing system separate from the video stream. In another example, the prediction is presented in a companion application that is visually presented simultaneously with the video feed of the live-action sporting event. For example, the video feed and the companion application may be visually presented side-by-side in a snap mode.

In some implementations, the methods and processes described herein may be tied to a computing system of one or more computing devices. In particular, such methods and processes may be implemented as a computer-application program or service, an application-programming interface (API), a library, and/or other computer-program product.

Figure 8:
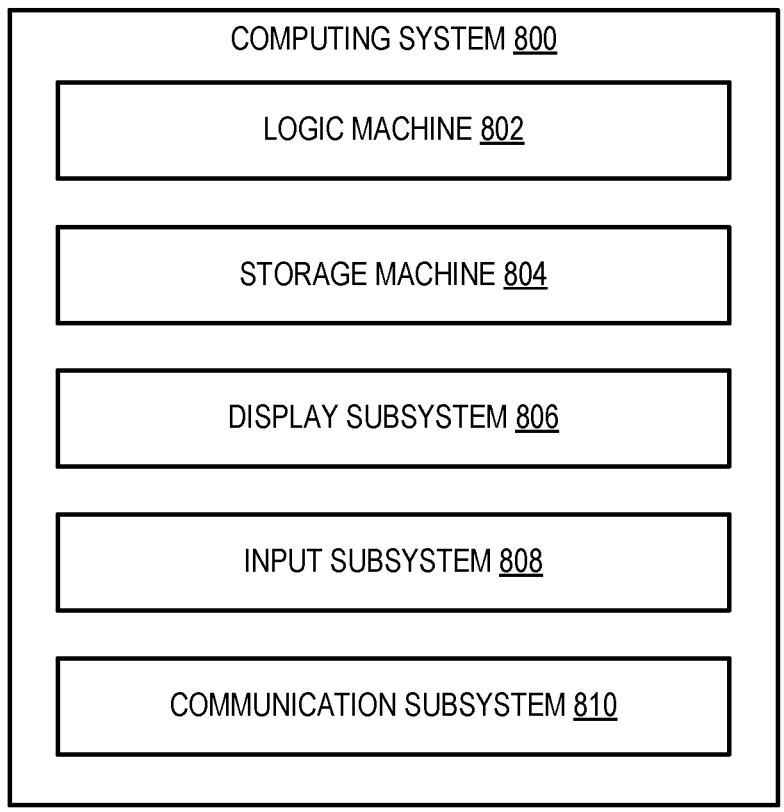
FIG. 8 shows an example computing system.

FIG. 8 schematically shows a non-limiting implementation of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices. Computing system 800 may be representative of computing system 102, auxiliary computing system 118, peripheral content source 106A, content-related service computing system 124A, and/or third-party computing service computing system 124B of FIG. 1. Further computing system 800 may be representative of historical football data computing system 206, prediction trainer computing system 208, live football data reporting computing system 212, statistical data service computing system 214, prediction service computing system 216, and/or client computing system 218 of FIG. 2.

Computing system 800 includes a logic machine 802 and a storage machine 804. Computing system 800 may optionally include a display subsystem 806, input subsystem 808, communication subsystem 810, and/or other components not shown in FIG. 8.

Logic machine 802 includes one or more physical devices configured to execute instructions. For example, the logic machine 802 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic machine 802 may include one or more processors configured to execute software instructions. Additionally or alternatively, logic machine 802 may include one or more hardware or firmware logic machines configured to execute hardware or firmware instructions. Processors of logic machine 802 may be single-core or multi-core, and the instructions executed thereon may be configured for sequential, parallel, and/or distributed processing. Individual components of logic machine 802 optionally may be distributed among two or more separate devices, which may be remotely located and/or configured for coordinated processing. Aspects of logic machine 802 may be virtualized and executed by remotely accessible, networked computing devices configured in a cloud-computing configuration.

Storage machine 804 includes one or more physical devices configured to hold instructions executable by logic machine 802 to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

Storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 implemented to perform a particular function. In some cases, a module, program, or engine may be instantiated via logic machine 802 executing instructions held by storage machine 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 806 may be used to present a visual representation of data held by storage machine 804. This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic machine 802 and/or storage machine 804 in a shared enclosure, or such display devices may be peripheral display devices. For example, display subsystem 806 may represent display 104 of FIG. 1.

When included, input subsystem 808 may comprise or interface with one or more user-input devices such as a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, communication subsystem 810 may be configured for communication via a wireless telephone network, or a wired or wireless local- or wide-area network. In some implementations, communication subsystem 810 may allow computing system 800 to send and/or receive messages to and/or from other devices via a network such as the Internet. For example communication subsystem 810 may include a computer network interface configured to communicate with other computing systems over a computer network. For example, the computer network interface may be implemented via one or more of hardware, software, firmware, or a combination thereof.

Aspects of the present disclosure are further described below. According to one aspect, a service computing system comprises a computer network interface, a logic machine in operative communication with the computer network interface, and a storage machine holding instructions executable by the logic machine to, receive, during a live-action sporting event, live-action sporting event data from a sporting event reporting computing system via the computer network interface, provide the live-action sporting event data to a machine-learning prediction machine previously trained with previously-completed sporting event data to output a prediction for an upcoming aspect of the live-action sporting event, and send the prediction to a client computing system via the computer network interface prior to commencement of the upcoming aspect to enhance a live-action sporting event experience provided by the client computing system. In this aspect, the storage machine further may hold instructions executable by the logic machine to, calculate derivative data from the live-action sporting event data, and provide the derivative data to the machine-learning prediction machine to output the prediction for the upcoming aspect of the live-action sporting event. The machine-learning prediction machine may be previously trained on derivative data corresponding to previously-completed sporting event data. In this aspect the prediction may include a probability of a scoring event occurring during the upcoming aspect. In this aspect, the prediction may include a probability of an identified player being involved in the upcoming aspect. In this aspect, the live-action sporting event may be a football game, the upcoming aspect may be a next play in the football game, and the prediction may include a probability of the next play being a run play. In this aspect, the live-action sporting event may be a football game, the upcoming aspect may be a next play in the football game, and the prediction may include a probability of the next play being a pass play.

According to another aspect, on a service computing system a method for making predictions for a live-action football game comprises receiving, during the live-action football game, live-action football game data from a football game reporting computing system via a computer network interface, providing the live-action football game data to a machine-learning prediction machine previously trained with previously-completed football game data to output a prediction for an upcoming play of the live-action football game, and sending the prediction to a client computing system via the computer network interface prior to commencement of the upcoming play to enhance a live-action football game experience provided by the client computing system. In this aspect, the method may further comprise calculating derivative data from the live-action football game data, and providing the derivative data to the machine-learning prediction machine to output the prediction for the upcoming play of the live-action football. The machine-learning prediction machine may be previously trained on derivative data corresponding to previously-completed football game data. In this aspect, the prediction may include a probability of a scoring event occurring in the upcoming play. In this aspect, the prediction may include a probability of an identified player being involved in the upcoming play. In this aspect, the prediction may include a probability of the upcoming play being a run play. In this aspect, the prediction may include a probability of the upcoming play being a pass play.

According to another aspect, a client computing system comprises a logic machine, and a storage machine holding instructions executable by the logic machine to receive, via one or more content sources, a plurality of video streams corresponding to a plurality of live-action sporting events currently taking place, for each of two or more of the plurality of live-action sporting events, receive a prediction for an upcoming aspect of that live-action sporting event prior to commencement of the upcoming aspect, the prediction being output from a machine-learning prediction machine previously trained with previously-completed sporting event data, select a live-action sporting event of interest from the plurality of live-action sporting events based on one or more pending predictions for upcoming aspects that have not yet commenced, and provide a selection notification for the live-action sporting event of interest. In this aspect providing the selection notification may include visually presenting, via a display, a proposal to visually present a video stream of the live-action sporting event of interest. In this aspect, providing the selection notification may include automatically visually presenting, via a display, a video stream of the live-action sporting event of interest. In this aspect the storage machine may further hold instructions executable by the logic machine to visually present, via a display, a video stream of the live-action sporting event of interest, and visually present, via the display, the prediction of the upcoming aspect of the live-action sporting event of interest simultaneously with the video stream. In this aspect, the storage machine may further hold instructions executable by the logic machine to receive user preference data of a user associated with the client computing system. The live-action sporting event of interest may be selected further based on the user preference data. In this aspect, the user preference data may include one or more of a favorite team of the user, a favorite player of the user, and a player on a fantasy team of the user. In this aspect, the storage machine may further hold instructions executable by the logic machine to receive a plurality of video streams for the live-action sporting event of interest, and select a video stream of interest from the plurality of video streams based on the one or more pending predictions and the user preference data. In this aspect, the prediction may include a probability of a scoring event occurring during the upcoming aspect. The live-action sporting event of interest may be selected based on having a highest probability of a scoring event occurring during the upcoming aspect.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A service computing system, comprising:
a computer network interface;
a logic machine in operative communication with the computer network interface; and
a storage machine holding instructions executable by the logic machine to:
receive, during a live-action sporting event, live-action sporting event data from a sporting event reporting computing system via the computer network interface;
provide the live-action sporting event data to a machine-learning prediction machine previously trained with previously-completed sporting event data to output a prediction for an upcoming aspect of the live-action sporting event; and send the prediction to a client computing system via the computer network interface prior to commencement of the upcoming aspect, wherein the prediction is visually presented as an overlay on a video of the live-action sporting event prior to visually presenting the upcoming aspect of the live-action sporting event in the video.

2. The service computing system of claim 1, wherein the storage machine further holds instructions executable by the logic machine to:

calculate derivative data from the live-action sporting event data; and provide the derivative data to the machine-learning prediction machine to output the prediction for the upcoming aspect of the live-action sporting event, the machine-learning prediction machine previously trained on derivative data corresponding to previously-completed sporting event data.

3. The service computing system of claim 1, wherein the prediction includes a probability of a scoring event occurring during the upcoming aspect.

4. The service computing system of claim 1, wherein the prediction includes a probability of an identified player being involved in the upcoming aspect.

5. The service computing system of claim 1, wherein the live-action sporting event is a football game, wherein the upcoming aspect is a next play in the football game, and wherein the prediction includes a probability of the next play being a run play.

6. The service computing system of claim 1, wherein the live-action sporting event is a football game, wherein the upcoming aspect is a next play in the football game, and wherein the prediction includes a probability of the next play being a pass play.

7. On a service computing system, a method for making predictions for a live-action football game, the method comprising:

receiving, during the live-action football game, live-action football game data from a football game reporting computing system via a computer network interface;

providing the live-action football game data to a machine-learning prediction machine previously trained with previously-completed football game data to output a prediction for an upcoming play of the live-action football game; and sending the prediction to a client computing system via the computer network interface prior to commencement of the upcoming play, wherein the prediction is visually presented with a video of the live-action football game prior to visually presenting the upcoming play in the video.

8. The method of claim 7, further comprising:

calculating derivative data from the live-action football game data; and providing the derivative data to the machine-learning prediction machine to output the prediction for the upcoming play of the live-action football, the machine-learning prediction machine previously trained on derivative data corresponding to previously-completed football game data.

9. The method of claim 7, wherein the prediction includes a probability of a scoring event occurring in the upcoming play.

10. The method of claim 7, wherein the prediction includes a probability of an identified player being involved in the upcoming play.

11. The method of claim 7, wherein the prediction includes a probability of the upcoming play being a run play.

12. The method of claim 7, wherein the prediction includes a probability of the upcoming play being a pass play.

13. A client computing system, comprising:

a logic machine; and a storage machine holding instructions executable by the logic machine to:

receive, via one or more content sources, a plurality of video streams corresponding to a plurality of live-action sporting events currently taking place;

for each of two or more of the plurality of live-action sporting events, receive a prediction for an upcoming aspect of that live-action sporting event prior to commencement of the upcoming aspect, the prediction being output from a machine-learning prediction machine previously trained with previously-completed sporting event data;

select a live-action sporting event of interest from the plurality of live-action sporting events based on one or more pending predictions for upcoming aspects that have not yet commenced; and provide a selection notification for a video stream corresponding to the live-action sporting event of interest prior to the upcoming aspect of the live-action sporting event being visually presented in the corresponding video stream.

14. The client computing system of claim 13, wherein providing the selection notification includes visually presenting, via a display, a proposal to visually present a video stream of the live-action sporting event of interest.

15. The client computing system of claim 13, wherein providing the selection notification includes automatically visually presenting, via a display, a video stream of the live-action sporting event of interest.

16. The client computing system of claim 13, wherein the storage machine further holds instructions executable by the logic machine to:

visually present, via a display, a video stream of the live-action sporting event of interest; and visually present, via the display, the prediction of the upcoming aspect of the live-action sporting event of interest simultaneously with the video stream.

17. The client computing system of claim 13, wherein the storage machine further holds instructions executable by the logic machine to:

receive user preference data of a user associated with the client computing system; and wherein the live-action sporting event of interest is selected further based on the user preference data.

18. The client computing system of claim 17, wherein the user preference data includes one or more of a favorite team of the user, a favorite player of the user, and a player on a fantasy team of the user.

19. The client computing system of claim 17, wherein the storage machine further holds instructions executable by the logic machine to:

receive a plurality of video streams for the live-action sporting event of interest; and select a video stream of interest from the plurality of video streams based on the one or more pending predictions and the user preference data.

20. The client computing system of claim 13, wherein the prediction includes a probability of a scoring event occurring during the upcoming aspect, and wherein the live-action sporting event of interest is selected based on having a highest probability of a scoring event occurring during the upcoming aspect.

\* \* \* \* \*